July 21, 1931. P. NACHTSHEIM 1,815,113

VALVE

Filed Aug. 16, 1930

Peter Nachtsheim
INVENTOR

BY

ATTORNEY

Patented July 21, 1931

1,815,113

UNITED STATES PATENT OFFICE

PETER NACHTSHEIM, OF NEW YORK, N. Y.

VALVE

Application filed August 16, 1930. Serial No. 475,811.

My invention is an improvement in valves, and is a division of my filed application for Letters Patent on valve constructions, Serial Number 429,419, dated February 18th, 1930.

This invention relates to improvements in valve constructions, and more especially to that type of valves having rotary valve plugs.

The primary object of the invention is a novel provision of a valve construction of the kind specified, wherein positive provision is made to adjust the engagement of the valve plug in the valve seat without affecting the rotation of the valve plug in the valve seat and positive provision is also made to rotate the valve plug in the valve seat to any position without affecting the adjustment of the valve plug in the valve seat.

Relative friction and possible sticking of the different parts is eliminated, as far as it enters into the function of the operation of the valve.

A further object of the invention is the provision of a valve construction of this character, which is extremely simple in construction, thoroughly reliable and efficient in its purposes, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 4:
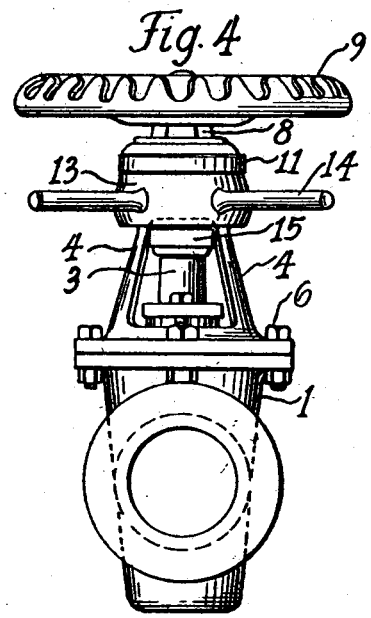

Figure 4 is an elevation of a bonnet type plug valve construction in accordance with the invention.

Figure 1:
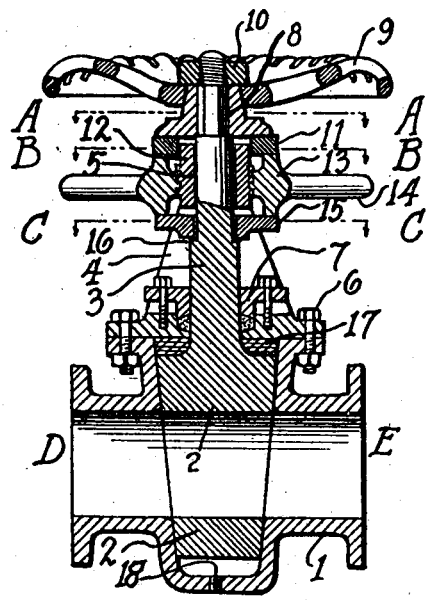
Figure 1 is a vertical longitudinal sectional view of a bonnet type plug valve construction in accordance with the invention.
Figure 5:
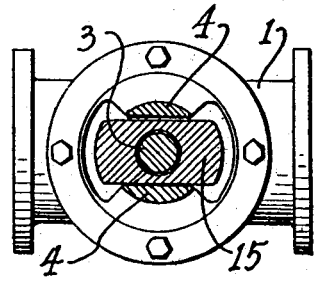

Figure 5 is a section on the line C—C of Figure 1.
Similar reference characters indicate corresponding parts throughout the several views in the drawings.

Referring to the drawings in detail, there is shown a valve casing 1, in this instance having flanged inlet and outlet ends D and E, for the connection of pipe sections therewith, although it is understood that said ends may be threaded for such connection, or otherwise formed for the connection of said pipe sections, if found desirable.

Fitted within the casing 1 is a rotary cone plug 2, having a bore that registers with the inlet and outlet passage of the casing when in open position, but shuts off the valve on a ninety degree turn. The stem 3 of plug 2 is passed upwardly through a bonnet yoke 4, and a bonnet head 5, the base of said yoke being fastened to the casing by bolts 6, and closed by a gasket (not shown) or a ground joint. The yoke may also be screwed to the casing. The bonnet yoke 4 is provided with a stuffing box 7, which surrounds the stem 3 and carries the usual packing. The stuffing box 7 may be of any desirable type to afford a fluid tight seal about the said stem. It is understood that the cone taper of the plug 2, may be reversed and its seat correspondingly.

Figure 2:
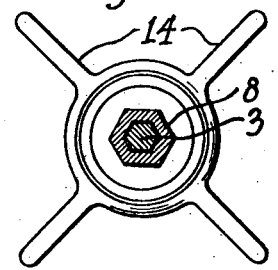
Figure 2 is a section on the line A—A of Figure 1.
Figure 3:
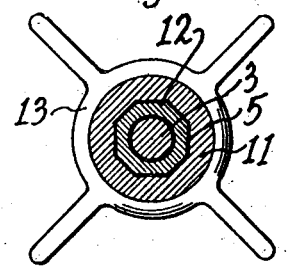
Figure 3 is a section on the line B—B of Figure 1.

Secured to the upper end of the plug stem 3, is a turning cap 8, preferably by multi-siding said stem and the opening in the cap therefor, as shown in Figure 2; and likewise this cap 8 externally is upwardly tapered and multisided at its upper portion for the secure fitting of a hand wheel 9, therewith, the latter being made fast by a nut 10, threaded on the upper free end of the said stem 3.

The bottom of cap 8 is in sliding contact with washer sleeve 11, which is formed with a multisided center opening for slidable engagement on a correspondingly multisided end 12, on the bonnet head 5, while immediately below said end 12, on the bonnet head 5 are external screw threads with which is engaged an adjustable raising and lowering collar 13, which has engaged therewith suitable handles 14, although any other kindred implement may be employed for actuating the collar 13. This collar 13, plays against the under side of the washer sleeve 11.

In place of handwheel 9, any other turning implement may be substituted.

Just below collar 13 and in sliding contact therewith is washer sleeve 15; its opening is round and fits slidably to the stem 3.

Figure 5 shows the plan shape of washer sleeve 15, it is prevented from turning horizontally through a machined fit to the inside of bonnet yoke 4. The bottom of washer sleeve 15 rests on a circular projection of stem 3, obtained by reducing the diameter of stem 3 at point 16. Washer sleeves 11 and 15, being secured against horizontal movement can only move vertically up or down, when collar 13 is actuated, and when one washer sleeve moves up or down the other will follow. Between the plug 2 and the base of the bonnet yoke 4, is a suitable resilient packing 17, which is caused to become compressed when the said plug is released vertically from its seat. In the bottom of casing 1, is a removable threaded tap 18, for draining purposes.

It will be obvious that by adjusting the collar 13, the plug 2, can be tightened in its seat in the casing 1, or loosened therein, by a longitudinal thrust on the stem 3 of said plug imparted thereto by either collar sleeve 11 or collar sleeve 15.

It will also be obvious by reason of the interpositioning of washer sleeves 11 and 15 the horizontal movement of collar 13 will be transposed into a vertical movement, so as to not affect the rotation of the valve plug 2.

What is claimed is:

1. In a valve construction, a casing having an inlet and outlet and also provided with a tapered bore therethrough, a turn valve plug with a passage bore to register with inlet and outlet of casing when open, with the turn valve plug tapered to the bore of the casing and fitted therein, a bonnet yoke fastened to the casing, a ring locked to one end of the valve plug, an adjusting collar externally engaged on the casing and bonnet yoke, a washer sleeve interposed between the ring and collar and held against turning movement horizontally, but free to move vertically, another washer sleeve positioned below the collar and resting on a shoulder of the stem above said turn valve plug, held against turning movement horizontally but free to move vertically, means for moving said adjusting collar to effect tightening or loosening of said turn valve plug in its seat in the valve casing without affecting the rotation of the valve plug.

2. A valve construction, comprising a casing, a turn valve plug therein, and having a stem, means on the upper end of the stem for effecting turning of the plug, and means exteriorly of and adjustable on the casing and active upon the first named means for shifting the plug in the casing to tighten or loosen said plug therein, and means interposed between the first and last named means to prevent transmission of turning movement of one to the other.

3. A valve construction, comprising a casing having an inlet and outlet, and also having a tapered bore therethrough preferably at right angles to the inlet and outlet, a turn valve plug with a stem extension, with a bore through said valve plug to register with the inlet and outlet of the casing when in open position, a turn valve plug tapered to the bore of the casing and fitted therein, a bonnet yoke fastened to the casing, a ring locked to the end of the stem of the valve plug, an adjusting collar externally engaged on the bonnet yoke, a washer sleeve interposed between the ring and collar and held against turning by locking it horizontally to the end of the bonnet yoke, another washer sleeve interposed between the collar and a shoulder of the stem of the turn valve plug, with said washer sleeve held against turning by locking it horizontally against the legs of the bonnet yoke, means for moving said adjusting collar to effect tightening or loosening of said turn valve plug in its seat in the valve casing by imparting or releasing a longitudinal thrust on the turn valve plug through said interpositioned washer sleeves in its seat in the valve casing without affecting the rotation of the turn valve plug, means to likewise rotate the turn valve plug without affecting the adjustment of the turn valve plug in its seat in the casing through the interpositioning of the same above said washer sleeves.

PETER NACHTSHEIM.